United States Patent
Niles et al.

(10) Patent No.: US 9,349,206 B2
(45) Date of Patent: May 24, 2016

(54) EDITING ANIMATED OBJECTS IN VIDEO

(71) Applicant: Apple Inc., Cupertino, CA (US)

(72) Inventors: Gregory E. Niles, Culver City, CA (US); Richard H. Salvador, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 399 days.

(21) Appl. No.: 13/789,997

(22) Filed: Mar. 8, 2013

(65) Prior Publication Data

US 2014/0253560 A1 Sep. 11, 2014

(51) Int. Cl.
*G06T 13/80* (2011.01)

(52) U.S. Cl.
CPC ............. *G06T 13/80* (2013.01); *G06T 2213/08* (2013.01)

(58) Field of Classification Search
None
See application file for complete search history.

(56) References Cited

U.S. PATENT DOCUMENTS

| | | | |
|---|---|---|---|
| 6,204,840 B1 * | 3/2001 | Petelycky et al. | 715/202 |
| 7,546,532 B1 | 6/2009 | Nichols et al. | |
| 7,644,364 B2 | 1/2010 | Patten et al. | |
| 7,804,503 B2 * | 9/2010 | Fernandez et al. | 345/475 |
| 8,549,404 B2 | 10/2013 | Swenson et al. | |
| 2005/0166150 A1 | 7/2005 | Chu | |
| 2010/0110082 A1 * | 5/2010 | Myrick et al. | 345/473 |
| 2010/0281385 A1 * | 11/2010 | Meaney et al. | 715/731 |
| 2010/0281386 A1 * | 11/2010 | Lyons et al. | 715/731 |
| 2013/0097552 A1 * | 4/2013 | Villaron et al. | 715/781 |

* cited by examiner

*Primary Examiner* — Zhengxi Liu
*Assistant Examiner* — Ryan M Gray
(74) *Attorney, Agent, or Firm* — Fish & Richardson P.C.

(57) ABSTRACT

In one aspect, in general, a method includes receiving, in a user interface of a video editing application executing on a computer system, an indication from a user of the video editing application to edit an animated object associated with a video clip displayed in the user interface, receiving, by the video editing application executing on the computer system, data specifying an editing location of the animated object, and determining, by the video editing application executing on the computer system, a frame of the video clip associated with the editing location of the animated object, the determination based on the data specifying the editing location of the animated object. Other aspects may include corresponding systems, apparatus, and computer program products.

18 Claims, 7 Drawing Sheets

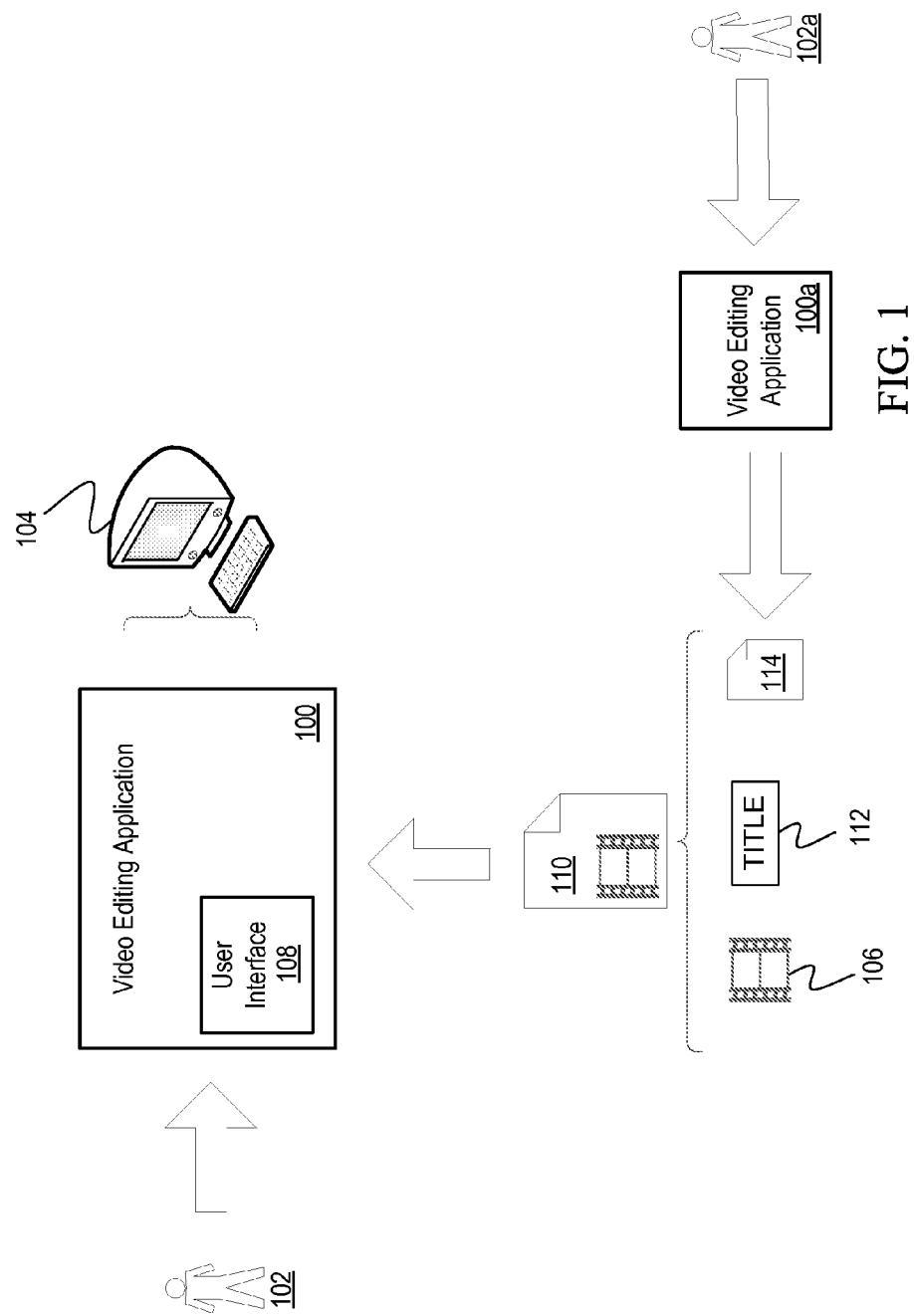

EDITING ANIMATED OBJECTS IN VIDEO

TECHNICAL FIELD

The disclosure generally relates to editing animated objects in video.

BACKGROUND

Video content can be edited in a video editing application. Video content can be stored in the form of one or more video clips compiled in a video project. Video clips include a portion of video content (frames of video, associated audio, and/or metadata). Each of the video clips can be accessed in a user interface, for example, to view the video clip, modify the video clip, or incorporate the video clip into a video project. The video editing application may enable a user to incorporate animated objects into one or more video clips. For example, an animated object could be a portion of text that moves into a video clip, fades into a video clip, etc. Some video editing applications enable a user to edit the animated object.

SUMMARY

In one aspect, in general, a method includes receiving, in a user interface of a video editing application executing on a computer system, an indication from a user of the video editing application to edit an animated object associated with a video clip displayed in the user interface, receiving, by the video editing application executing on the computer system, data specifying an editing location of the animated object, and determining, by the video editing application executing on the computer system, a frame of the video clip associated with the editing location of the animated object, the determination based on the data specifying the editing location of the animated object. Other aspects may include corresponding systems, apparatus, and computer program products.

Implementations of these aspects may include one or more of the following features. The aspect includes changing a frame of the video clip displayed in a current frame view of the user interface to the frame of the video clip associated with the editing location of the animated object. The data specifying the editing location of the animated object includes data specifying a location in time of the animated object. The data specifying the editing location of the animated object includes data specifying the frame of the video clip associated with the editing location of the animated object. The animated object, video clip, and data specifying the editing location of the animated object are stored in association with a video project file. The frame associated with an editing location of the animated object is determined based on an indication of the editing location specified by a second user of a second video editing application. The animated object comprises one or more words of text. The aspect includes receiving, in the user interface of a video editing application, an indication to move to a second editing location of the animated object. The editing location includes a location at which a first portion of the animated object is visible, and the second editing location includes a location at which a second portion of the animated object is visible. The first portion of the animated object comprises a first word of text, and the second portion of the animated object comprises a second word of text. The indication from a user of the video editing application to edit an animated object included in a video clip includes a user interface action upon a visual element representing the animated object displayed in the user interface. The editing location of the animated object includes a location in time of the animated object at which at least a threshold percentage of the animated object is visible.

Details of one or more implementations are set forth in the accompanying drawings and the description below. Other features, aspects, and potential advantages will be apparent from the description and drawings, and from the claims.

DESCRIPTION OF DRAWINGS

FIG. 1 shows a video editing application being operated by a user of a computer system.

Like reference symbols in the various drawings indicate like elements.

DETAILED DESCRIPTION

Figure 2A:
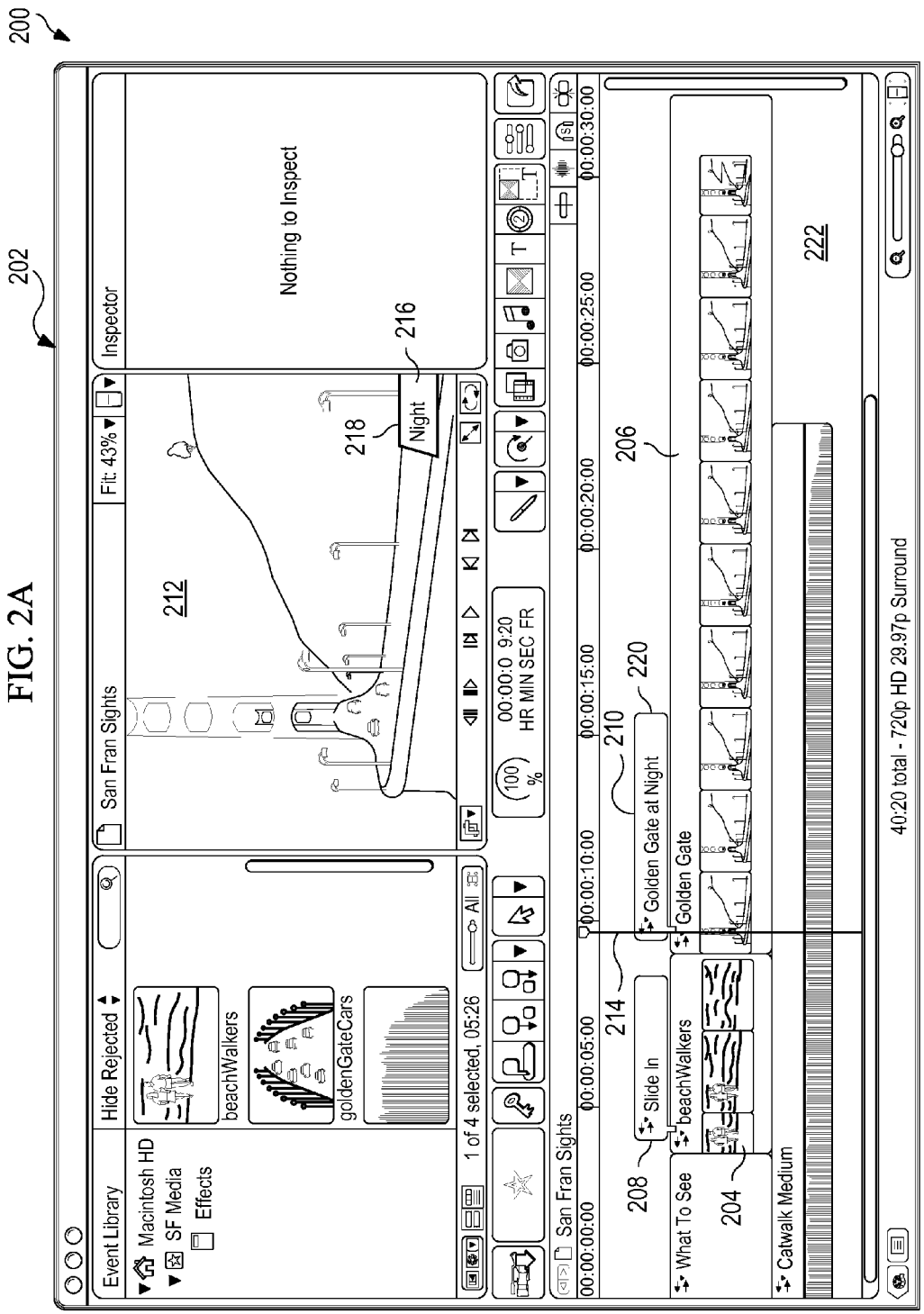
FIGS. 2A-4 show user interfaces of a video editing application.

Video editing software enables a user to manipulate animated objects, for example, text that appears in a video and is displayed in motion. The animated object can be displayed in the form of an animation, which is a visual representation of the animated object in motion. Animated objects are sometimes edited in a static form. For example, a static form of an animated object may be a state of the animated object at the beginning, middle, or end of an animation representing the object. If the animated object is animated by fading into a sequence of a video, the static form may be a final or near-final frame of the video sequence, so that most or all of the elements of the animated object are visible in the static form. If the animated object is animated by fading out of a sequence of a video, the static form may be an initial frame of the video sequence, so that most or all of the elements of the animated object are visible in the static form.

FIG. 1 shows a video editing application 100 being operated by a user 102 of a computer system 104. The video editing application 100 enables the user 102 to view and edit video clips 106 in a user interface 108. In some examples, the video clips 106 are stored as part of a video project 110. A video project 110 is a file representing a compilation of one or more video clips 106, generally arranged by a user to form a coherent theme. For example, a video project 110 could be a feature film, a television show, an interactive multimedia project, or other compilation of media.

In some implementations, a video clip 106 contains media content such as video content (e.g., a series of video frames) and audio content. In some examples, a video clip 106 contains only video data, or contains only audio data (e.g., an audio clip). A video clip 106 sometimes takes the form of a data file stored on a storage medium, but a video clip 106 could also take other forms. In some examples, a video clip 106 could be a filtered portion of a media file. In some examples, a video clip 106 could be a "compound clip" that includes multiple clips. In some examples, a video clip 106 could be a "multicam clip" that includes multiple clips from different sources (e.g., different cameras or other recording devices) that are synchronized.

A video project 110 can also contain one or more animated objects 112. An animated object 112 is a representation of an object displayable in motion and represented by data other than video data. For example, an animated object 112 could be one or more words of text, such as text representing a title of the video or other information. In this example, the animated object 112 includes data representing the text, e.g., data in a standard format used for text such as ASCII, Unicode, etc. In contrast, video clips 116 include data representing frames of video, audio, etc. The animated object 112 could be displayed in motion overlaid upon one or more video clips 106, moving into and/or out of a field of view represented by one or more video clips 106, fading into or out of a field of view represented by one or more video clips 106, etc. An animated object 112 displayed in motion is sometimes called an animation.

A video project 110 can also contain an editing location specification 114 for the animated object 112. The editing location specification 114 indicates a temporal location (i.e., a location in time or amount of elapsed time, sometimes called simply a location) within the animation representing the animated object 112 at which the animated object 112 can be edited by a user 102. For example, if the animated object 112 is a visual representation of text fading into a video sequence, then the editing location specification 114 may specify a temporal location within the animation representing the animated object 112 at which the text has fully faded into the video sequence and thus is fully visible. In this way, the user 102 can view the text of the animated object 112 while he or she is editing it, and the animated object 112 can be displayed in substantially the same way that the animated object would be displayed in a final form (e.g., in a final video generated from the video project 110 and then played back in video playback software, on a television or other media device, etc.). In some implementations, the editing location specification 114 indicates a frame of a video clip 106 corresponding to the editing location of the animated object 112. For example, if the animated object 112 is displayed as an animation in overlay upon a video clip 106, then the temporal location at which the animated object 112 can be edited may correspond to a particular frame of a video clip 106. Put another way, when the video project 110 is played back as a video, the editing location at which the animation representing the animated object 112 is displayed at the same time at which a particular frame of a video clip 106 is displayed. In some implementations, the editing location specification 114 indicates a time offset corresponding to the editing location of the animated object 112. For example, if the animated object 112 is displayed as an animation, then the temporal location at which the animated object 112 can be edited may correspond to a particular amount of time elapsed in the animation of the animated object 112, rather than a particular frame of the video clip 106.

The editing location specification 114 may contain one or more types of data specifying an editing location. In some implementations, the particular frame of a video clip 106 can be specified in the editing location specification 114. In some implementations, a time value (e.g., representing a time offset) is specified in the editing location specification 114. For example, if the editing location occurs thirty seconds into the animation representing the animated object 112, the editing location specification 114 may indicate a time value of thirty seconds (e.g., in the form of a time index or another form of information specifying time) as the editing location. The video editing application can then determine a frame of a video clip 106 corresponding to the editing location specified in the editing location specification 114, e.g., by comparing an elapsed time of the video clip 106 to an elapsed time of an animation representing the animated object 112. In some examples, the editing location specification 114 specifies multiple editing locations for the same animated object 112.

In some implementations, the editing location specification 114 is defined by another user 102a of a video editing application 100a. For example, the other user 102a can indicate which frame of the video clip 106 corresponds to an editing location for the animated object 112. Data specifying the frame indicated by the other user 102a is then stored in association with the video project 110 in the form of the editing location specification 114. When the video project 110 is accessed by the user 102 of the video editing application 100 then the user 102 can access the editing location specified by the other user 102a.

In some examples, the same user 102 specifies the video frame or temporal location for the editing location specification 114 and later accesses the editing location specification 114 when editing the video project 110. In some examples, the video editing application 100 is one instance of a particular kind of video editing application (e.g., a particular software product), and the other video editing application 102a is another instance of the same kind of video editing application. An instance of an application is a particular execution of software. For example, the first video editing application 100 could be an instance of Final Cut Pro (produced by Apple Inc. of Cupertino, Calif.) executed on a computer system, and the other video editing application 102a could be another instance of Final Cut Pro executed on a different computer system or the same computer system, each by different users or the same user. In some examples, the same instance of the video editing application could be used to define the editing location specification 114 and later access the editing location specification 114.

In some examples, the editing location specification 114 is determined automatically. For example, the video editing application 100 can assign an editing location to an animated object 112 based on a threshold percentage of the animated object 110 that is visible at a location in time of the animated object 112. As a particular example, if a certain percentage (e.g., 60% or 80% or 100%) of the animated object 112 is visible after thirty seconds of the animation representing the animated object 112 have elapsed, then the video editing application 100 could generate an editing location specification 114 specifying a temporal location of thirty seconds as the editing location of the animated object 112.

FIG. 2A shows a user interface 200 of a video editing application (e.g., the video editing application 100 shown in FIG. 1). For example, the user interface 200 may be operated by a user (e.g., the user 102 shown in FIG. 1) and enables the user to control functionality of the video editing application. A video project 202 that includes video clips 204, 206 and animations 208, 210 is being edited in the user interface 200. The user interface 200 shows a current frame 212 of the video project 202, which corresponds to a frame at a location 214 of one of the video clips 208. One of the animations 210 is positioned temporally such that it overlaps with a portion of the video clip 206. In this way, when the video project 202 is played as a video, the portion of the video clip 206 and the animation 210 play back simultaneously. The animation 210 is overlaid upon the video clip 206, such that the animation 210 obscures a portion of the video clip 206 within a visual field of playback (e.g., a view of a current frame 212 of the video project 202).

When the current frame 212 corresponding to the location 214 of the video clip 208 is displayed in the user interface 200, a static representation 216 of the animation 210 corresponding to the location 214 of the video clip 208 is displayed overlaid upon the current frame 212. The static representation 216 is a view of the animation 210 as it would appear during playback at the point in time represented by the current frame 212.

In this example, the animation 210 includes text 218 that is animated in a way that it "slides" into the video. As the animation 210 progresses in time, more of the text 218 is revealed. At this location 214 of the video clip 208, only a portion of text is displayed. The complete text would be displayed at a location of the video clip 208 later in time, after the text has completed its "slide" into the visual field of playback.

If the user operating the user interface 200 wishes to edit the animation 210 (e.g., edit the text 218 of the animation 210), the user can take an action in the user interface 200. For example, the user can invoke a user interface element representing the animation 210. In some examples, the user interface element could be an icon 220 representing the animation 210 in a timeline view 222 of the user interface 200. In some examples, the user interface element could be the static representation 216 of the animation 210. A user invokes a user interface element by performing an action upon the user interface element. For example, the user may invoke a user interface element by clicking or double-clicking the user interface element with an input device such as a mouse, or tap or double-tap the user interface element on a touchscreen, or speak a command identifying the user interface element, or taking another action in the user interface.

When the user invokes a user interface element representing the animation 210, the user interface 200 enables the user to edit the animation 210. In some implementations, the user interface changes the current frame 212 of the video clip 206 to a location defined by an editing location of the animation 210 (e.g., as defined in an editing location specification 114 as shown in FIG. 1).

Figure 2B:
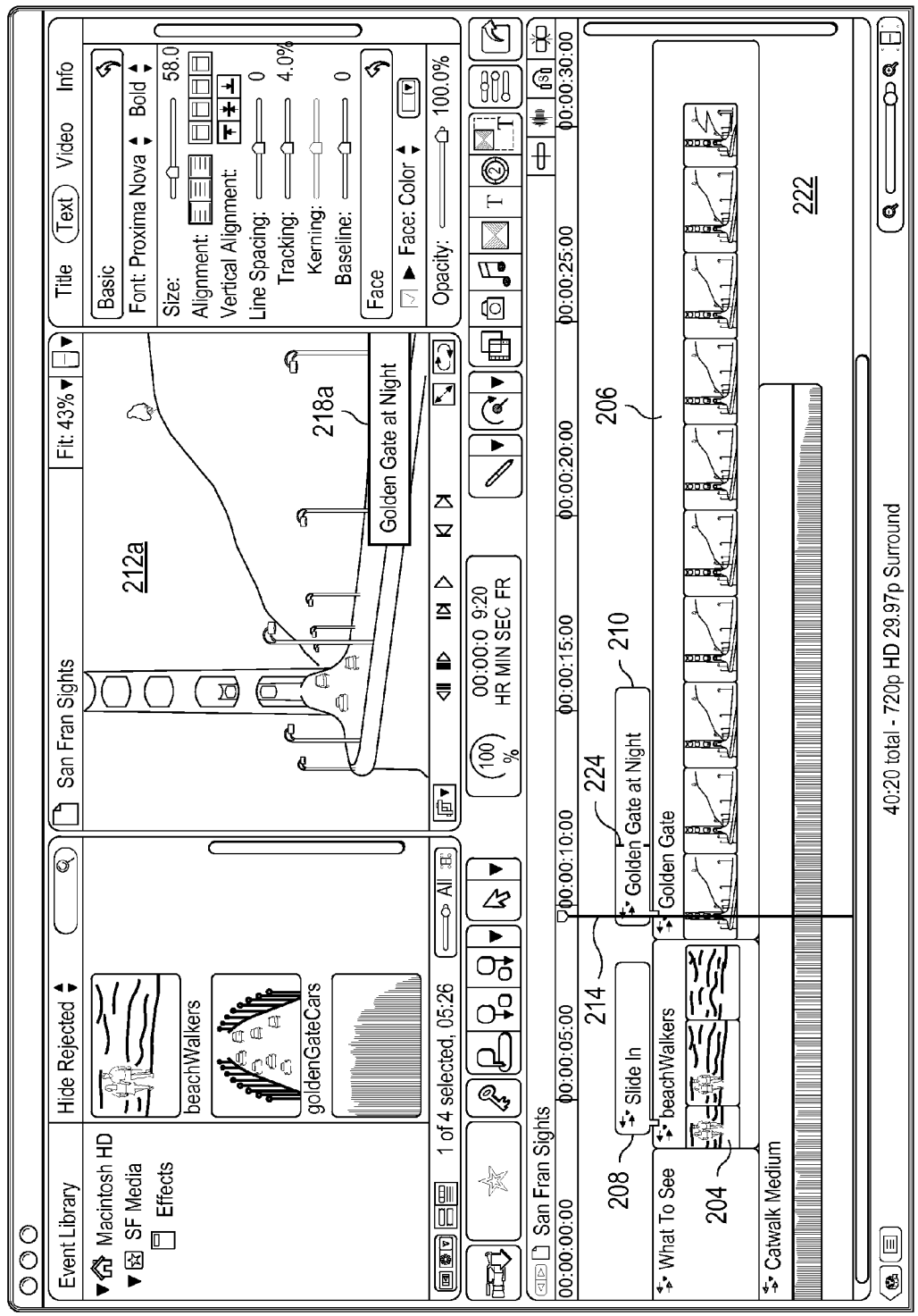

FIG. 2B shows the user interface 200 after the current frame 212a has been changed to display the frame of the video clip 206 corresponding to a location 224 defined by an editing location of the animation 210. In this example, all of the text 218a of the animation 210 is fully visible in the static representation 216a of the animation 210 as shown laid over the current frame 212a of the video clip 206. A user of the user interface 200 can then edit the text 218a, e.g., add or remove characters, change a font size or color, or perform any other kind of action upon the text.

Once the user has performed the action of editing the object represented by the animation 210 (in this example, editing the text of the animation 210), in some examples, the current frame 212a displayed by the user interface 200 may remain the frame at the location 224 defined by the editing location of the animation 210. In some examples, the current frame may revert to the previous location 214 of the video clip 208 as shown in FIG. 2A.

Figure 3:
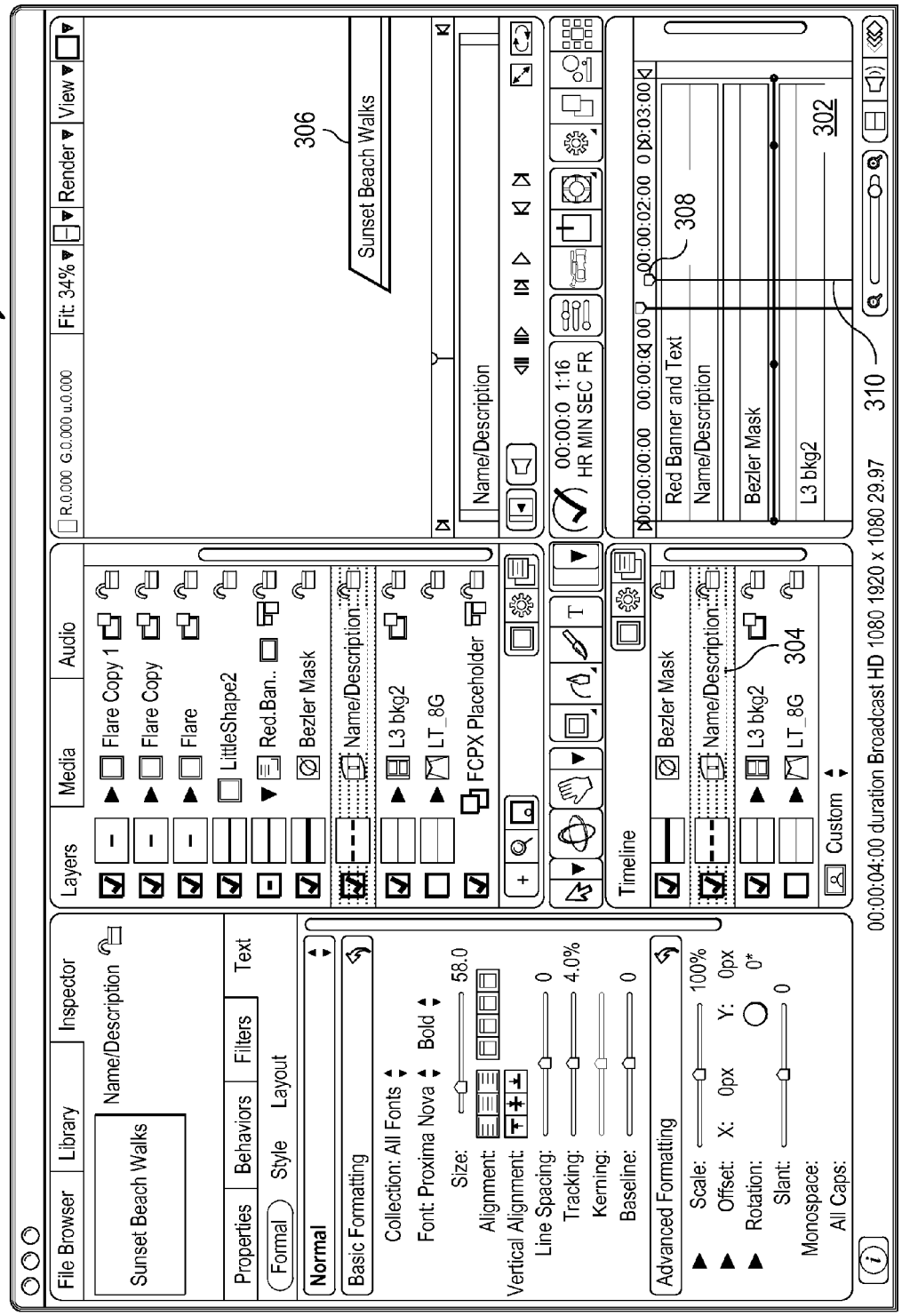

FIG. 3 shows another user interface 300 of a video editing application (e.g, the video editing application 100a shown in FIG. 1). This user interface 300 enables a user to specify the editing location of an animation. In some implementations, the user interface 300 displays a timeline view 302 of an animation 304 and a static view 306 of the animation 304. The user can specify a location 308 in the timeline view 302 as an editing location 310 of the animation 304. For example, if the animation 304 includes text, the user can specify a location at which the text is completely visible as an editing location 310. The user can specify the location by taking an action in the user interface 300. For example, the user might activate a command for adding an editing location 310 (e.g., a command offered in a menu or accessible by a keyboard shortcut) and then specify the editing location 310 by clicking, tapping, or otherwise indicating the location in the user interface 300.

Once the user has specified the editing location 310, the video editing application can store data specifying the editing location 310 in association with the animation 304. For example, the data may be stored in association with a data file containing the animation 310, a video project (e.g., the video project 110 shown in FIG. 1) associated with the animation 310, or the data may be stored in another form.

In some implementations, a user can specify multiple editing locations in the user interface 300. For example, the user may specify one editing location corresponding to a location in the animation 310 at which one portion of the animated object of the animation 310 is visible, another editing location corresponding to a location in the animation 310 at which another portion of the animated object of the animation 310 is visible, etc. For example, if the animation 310 represents text, then the user may specify one editing location corresponding to a location in the animation 310 at which one word of text is visible, another editing location corresponding to a location in the animation 310 at which another word of text is visible, etc. These techniques may be used, for example, for an animation 310 in which different portions are visible at different times, e.g., if one word of text is displayed after another disappears.

Figure 4:
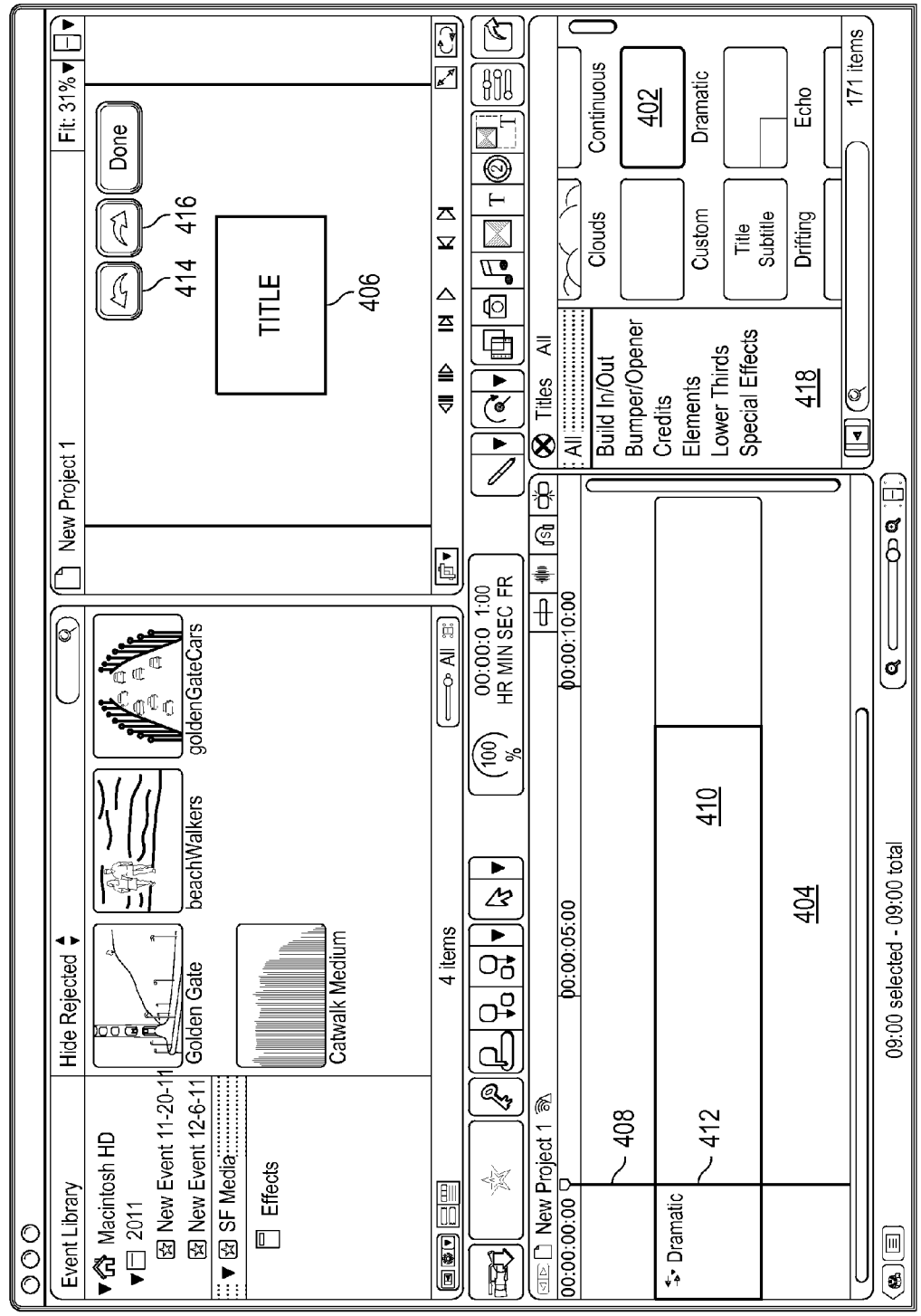

FIG. 4 shows another user interface 400 of a video editing application (e.g, the video editing application 100 shown in FIG. 1). For example, the user interface 400 shown here could be available during the same execution of the video editing application as the user interface 200 (FIG. 2) is available, and the two user interface 200, 400 could be accessed at different times. This user interface 400 enables a user to edit an animated object represented by an animation 402. The user interface 400 includes a timeline view 404 of the animation 402 and a static view 406 of the animation. The static view 406 represents a view of the animation 402 at the point in time represented by a current location 408 in the timeline view 404.

If a user invokes a representation 410 of the animation 402 in the timeline view 404 (e.g., clicks or taps the representation 410), the user interface 400 will set the current location 408 to an editing location 412 of the animation 402 (e.g., an editing location specified by an editing location specification 114 as shown in FIG. 1 or the editing location 310 shown in FIG. 3). In this way, a user of the user interface 400 has quick access to the editing location defined for this animation 402.

In some implementations, the user interface 400 includes a backward button 414 and a forward button 414 for changing the current location 408 among editing locations. In some examples, if multiple editing locations 412 are specified for the animation 402, then the buttons 414, 416, when invoked, enable a user to quickly skip between them. In some examples, if a single editing location 412 is specified for the animation 402, then the buttons 414,416 enable a user to skip to an editing location of another animation, e.g., an animation in a list of animations 418 available for editing in the user interface 400. As another example, if a user is at an editing location 412 of an animation 402 that is last in time (e.g., the last editing location before the temporal end of the animation 402) then the forward button 414 enables a user to skip to the editing location that is first in time for another animation.

Figure 5:
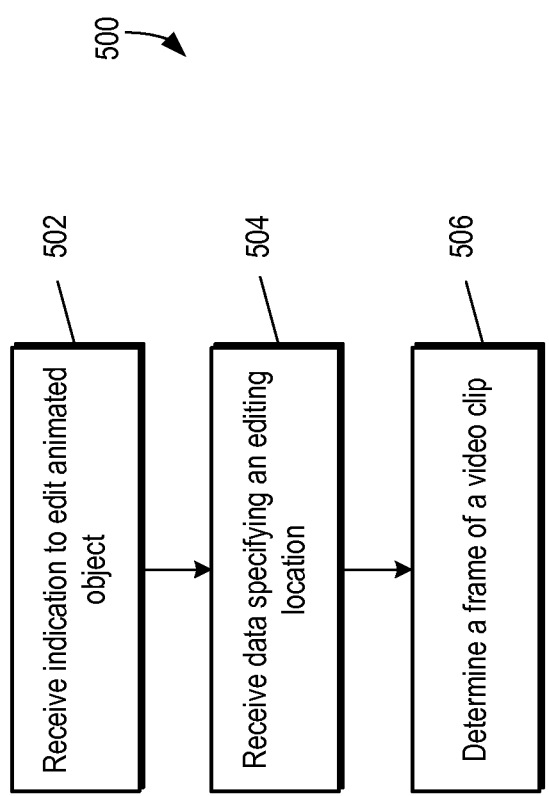
FIG. 5 is a flowchart of an exemplary process associated with editing animated objects in video.

FIG. 5 is a flowchart of an exemplary process 500 associated with editing animated objects in video. The process 500 can be performed, for example, by the computer system 104 shown in FIG. 1.

The process 500 includes receiving 502 an indication from a user of the video editing application to edit an animated object associated with a video clip. The video clip and the animated object are displayed in a user interface of a video editing application executing on a computer system. In some examples, the indication could be a user interface action upon a visual element representing the animated object displayed in the user interface. For example, a user could click, touch, or otherwise invoke an icon representing the animated object.

The process 500 includes receiving 502 data specifying an editing location of the animated object. The data is received by the video editing application executing on the computer system. In some examples, the data specifying the editing location of the animated object is data specifying a location in time of the animated object (e.g., a time index such as thirty seconds of time elapsed in an animation representing the animated object). In some examples, the data specifying the editing location of the animated object is data specifying the frame of the video clip associated with the editing location of the animated object (e.g., an indication of a particular frame of video such as frame 100 of the video). In some examples, the editing location of the animated object is a location in time of the animated object at which at least a threshold percentage of the animated object is visible.

The process 500 includes determining 506 a frame of the video clip associated with the editing location of the animated object. The frame is determined by the video editing application executing on the computer system. The frame associated with an editing location of the animated object may be determined based on an indication of the editing location specified by a second user of a second video editing application.

In some implementations, the process 500 includes changing a frame of the video clip displayed in a current frame view of the user interface to the frame of the video clip associated with the editing location of the animated object. In some implementations, the animated object, video clip, and data specifying the editing location of the animated object are stored in association with a video project file. In some implementations, the process 500 includes receiving an indication to move to a second editing location of the animation. For example, the first editing location could be a location at which a first portion of the animated object (e.g., a first word of text) is visible, and the second editing location could be a location at which a second portion of the animated object (e.g., a second word of text) is visible.

This disclosure describes various Graphical User Interfaces (UIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" or "invoking" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Figure 6:
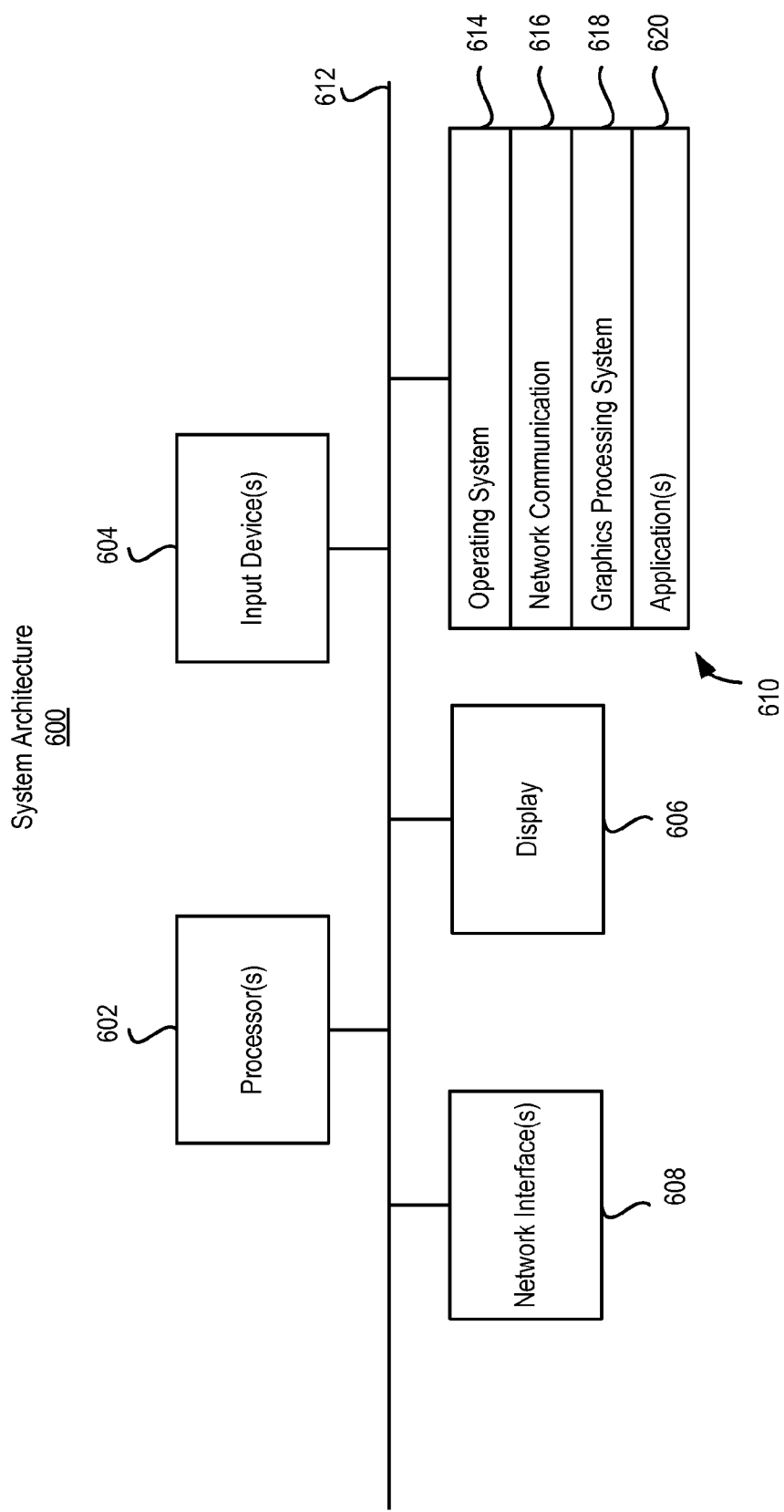
FIG. 6 is a block diagram of an exemplary system architecture implementing the features and processes of FIGS. 1-5.

FIG. 6 is a block diagram of an exemplary system architecture implementing the features and processes of FIGS. 1-5.

The architecture 600 can be implemented on any electronic device that runs software applications derived from compiled instructions, including without limitation personal computers, servers, smart phones, media players, electronic tablets, game consoles, email devices, etc. In some implementations, the architecture 600 can include one or more processors 602, one or more input devices 604, one or more display devices 606, one or more network interfaces 608 and one or more computer-readable mediums 610. Each of these components can be coupled by bus 612.

Display device 606 can be any known display technology, including but not limited to display devices using Liquid Crystal Display (LCD) or Light Emitting Diode (LED) technology. Processor(s) 602 can use any known processor technology, including but are not limited to graphics processors and multi-core processors.

Input device 604 can be any known input device technology, including but not limited to a keyboard (including a virtual keyboard), mouse, track ball, and touch-sensitive pad or display. In some implementations, the input device 604 could include a microphone that facilitates voice-enabled functions, such as speech-to-text, speaker recognition, voice replication, digital recording, and telephony functions. The input device 604 can be configured to facilitate processing voice commands, voiceprinting and voice authentication. In some implementations, audio recorded by the input device 604 is transmitted to an external resource for processing. For example, voice commands recorded by the input device 604 may be transmitted to a network resource such as a network server which performs voice recognition on the voice commands.

Bus 612 can be any known internal or external bus technology, including but not limited to ISA, EISA, PCI, PCI Express, NuBus, USB, Serial ATA or FireWire.

Computer-readable medium 610 can be any medium that participates in providing instructions to processor(s) 602 for execution, including without limitation, non-volatile storage media (e.g., optical disks, magnetic disks, flash drives, etc.) or volatile media (e.g., SDRAM, ROM, etc.).

Computer-readable medium 610 can include various instructions 614 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 can establish and maintain network connections (e.g., software for implementing communication protocols, such as TCP/IP, HTTP, Ethernet, etc.).

A graphics processing system 618 can include instructions that provide graphics and image processing capabilities. For example, the graphics processing system 618 can implement the processes described with reference to FIGS. 1-5.

Application(s) 620 can be an application that uses or implements the processes described in reference to FIGS. 1-5. For example, one of the applications 620 could be one of the video editing applications 100, 100a shown in FIG. 1. The processes can also be implemented in operating system 614.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
   displaying, in a user interface of a video editing application executing on a computer system, a first frame of a video clip and a first static representation of an animated text, wherein at least one full word of the animated text is not visible in the user interface;
   in response to an invocation of a user interface element representing the animated text:
   receiving, by the video editing application executing on the computer system, data specifying a location of the animated text in which the at least one full word is visible in the user interface when a static representation of the animated text corresponding to the location is displayed;
   determining, by the video editing application executing on the computer system, a second frame of the video clip, the second frame of the video clip associated with an editing location of the animated text, the determination based on the data specifying the location of the animated text in which the at least one full word is visible in the user interface; and
   displaying, in the user interface of the video editing application executing on the computer system, the second frame of the video clip and a second static representation of the animated text, wherein the at least one full word of the animated text is visible in the user interface.

2. The method of claim 1, wherein the at least one full word is displayed in the user interface overlaid upon the second frame of the video clip.

3. The method of claim 1, wherein the data specifying the location of the animated text comprises data specifying a location in time of the animated text.

4. The method of claim 1, wherein the data specifying the location of the animated text comprises data specifying the second frame of the video clip.

5. The method of claim 1, wherein the animated text, video clip, and data specifying the location of the animated text are stored in association with a video project file.

6. The method of claim 1, wherein the second frame is determined based on an indication of the editing location specified by a second user of a second video editing application.

7. A computer readable storage device encoded with instructions that, when executed by a computer system, cause a computer system to carry out operations comprising:
   displaying, in a user interface of a video editing application executing on the computer system, a first frame of a video clip and a first static representation of an animated text, wherein at least one full word of the animated text is not visible in the user interface;
   in response to an invocation of a user interface element representing the animated text:

receiving, by the video editing application executing on the computer system, data specifying a location of the animated text in which the at least one full word is visible in the user interface when a static representation of the animated text corresponding to the location is displayed;

determining, by the video editing application executing on the computer system, a second frame of the video clip, the second frame of the video clip associated with an editing location of the animated text, the determination based on the data specifying the location of the animated text in which the at least one full word is visible in the user interface; and displaying, in the user interface of the video editing application executing on the computer system, the second frame of the video clip and a second static representation of the animated text, wherein the at least one full word of the animated text is visible in the user interface.

8. The computer readable storage device of claim 7, wherein the at least one full word is displayed in the user interface overlaid upon the second frame of the video clip.

9. The computer readable storage device of claim 7, wherein the data specifying the location of the animated text comprises data specifying a location in time of the animated text.

10. The computer readable storage device of claim 7, wherein the data specifying the location of the animated text comprises data specifying the second frame of the video clip.

11. The computer readable storage device of claim 7, wherein the animated text, video clip, and data specifying the location of the animated text are stored in association with a video project file.

12. The computer readable storage device of claim 7, wherein the second frame is determined based on an indication of the editing location specified by a second user of a second video editing application.

13. A computer system comprising:

a processor configured to execute stored instructions;

a storage device storing instructions that, when executed, cause the computer system to carry out operations comprising:

displaying, in a user interface of a video editing application executing on the computer system, a first frame of a video clip and a first static representation of an animated text, wherein at least one full word of the animated text is not visible in the user interface;

in response to an invocation of a user interface element representing the animated text:

receiving, by the video editing application executing on the computer system, data specifying a location of the animated text in which the at least one full word is visible in the user interface when a static representation of the animated text corresponding to the location is displayed;

determining, by the video editing application executing on the computer system, a second frame of the video clip, the second frame of the video clip associated with an editing location of the animated text, the determination based on the data specifying the location of the animated text in which the at least one full word is visible in the user interface; and displaying, in the user interface of the video editing application executing on the computer system, the second frame of the video clip and a second static representation of the animated text, wherein the at least one full word of the animated text is visible in the user interface.

14. The computer system of claim 13, wherein the at least one full word is displayed in the user interface overlaid upon the second frame of the video clip.

15. The computer system of claim 13, wherein the data specifying the location of the animated text comprises data specifying a location in time of the animated text.

16. The computer system of claim 13, wherein the data specifying the location of the animated text comprises data specifying the second frame of the video clip.

17. The computer system of claim 13, wherein the animated text, video clip, and data specifying the location of the animated text are stored in association with a video project file.

18. The computer system of claim 13, wherein the second frame is determined based on an indication of the editing location specified by a second user of a second video editing application.

* * * * *